W. M. DUNCAN.
CAR TRUCK CONSTRUCTION.
APPLICATION FILED JAN. 31, 1913.
1,074,317.
Patented Sept. 30, 1913.
Fig. I.
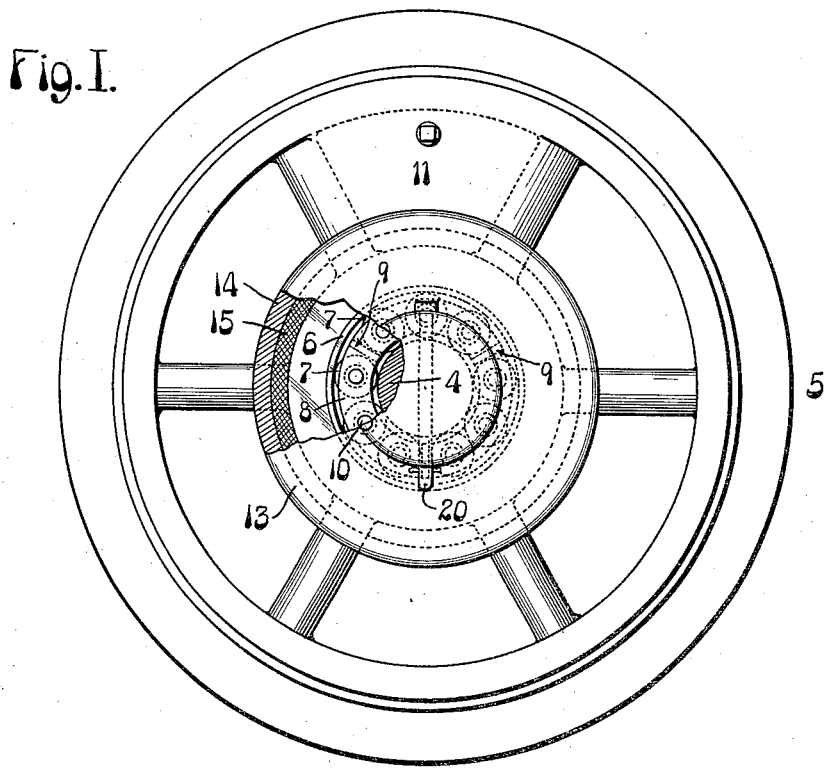
Fig. II.
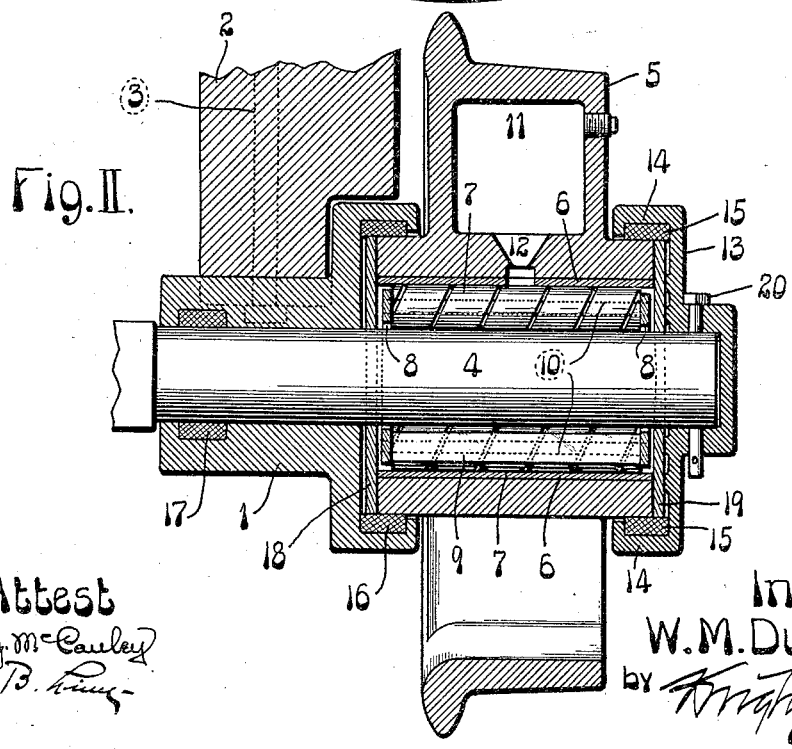
Attest
a.j. McCauley
E. B. King
Inventor:
W. M. Duncan
by Knight + Cook
Attys.

UNITED STATES PATENT OFFICE.

WILLIAM MILLEN DUNCAN, OF ALTON, ILLINOIS.

CAR-TRUCK CONSTRUCTION.

1,074,317.           Specification of Letters Patent.    Patented Sept. 30, 1913.

Application filed January 31, 1913. Serial No. 745,499.

*To all whom it may concern:*

Be it known that I, WILLIAM M. DUNCAN, a citizen of the United States of America, and resident of Alton, in the county of Madison and State of Illinois, have invented certain new and useful Improvements in Car-Truck Construction, of which the following is a full, clear, and exact description, reference being had to the accompanying drawings, forming a part of this specification.

My invention relates to a car truck construction and has for its object the production of an improved wheel and bearing structure including roller bearings for the wheel combined with new details of construction to produce a very durable and efficient truck structure for mine cars, or other small cars.

Figure I is a side elevation, partly in section, of a portion of my improved truck structure. Fig. II is a vertical section taken approximately through the center of the wheel.

In the accompanying drawings: 1 designates a bearing fastened to a car sill 2 by means of bolts 3, and 4 is a journal extending through said bearing. A wheel 5 is formed with a bore for the reception of a sleeve or lining 6, the latter being closely fitted to the wheel.

7 designates rollers located between the sleeve 6 and journal 4, said rollers being arranged in a cage comprising end rings 8, connected by bars 9, and also connected by rods 10 passing through the rollers 7. The wheel is preferably formed with an oil well 11 having an outlet port 12 leading to the rollers 7.

13 designates a cap detachably secured to the end of the journal 4, and provided with an annular flange 14 which overlaps the hub of the wheel and forms a pocket for a packing ring 15. The bearing 1 overlaps the hub at the inner face of the wheel, and is formed with a pocket for the reception of a packing ring 16. It will be noted that the packing rings 15 and 16 serve as dust guards and prevent the lubricant from escaping around the hub of the wheel. The bearing 1 is also provided with a packing ring 17 which surrounds the journal. An inner chafing ring 18 separates the bearings 1 from the inner face of the wheel hub, and the cap 13 is separated from the outer face of the hub by a chafing ring 19.

The rollers 7 are retained within the sleeve 6 by the chafing rings 18 and 19 and said rings are held in position by the bearing 1 at the inner face of the wheel and the removable cap 13 at the outer face of the wheel. The cap 13 is preferably attached to the journal by a pin 20, which may be very easily removed to permit the removal of the wheel or roller bearing cage.

I claim :—

1. A car truck structure comprising a bearing adapted to be fastened to the car, a journal extending through said bearing, a cap removably attached to the end of said journal, a wheel, and rollers between said wheel and journal, said wheel and rollers being interposed between said bearing and cap.

2. A car truck structure comprising a bearing adapted to be fastened to the car, a journal extending through said bearing, a cap removably attached to the end of said journal, a wheel, rollers between said wheel and journal, said wheel and rollers being interposed between said bearing and cap, an outer chafing ring between the outer face of said wheel and said cap, and an inner chafing ring located between said bearing and the inner face of said wheel.

3. A car truck structure comprising a wheel, a journal, a sleeve surrounding said journal and closely fitted to said wheel, rollers between said sleeve and journal, means for retaining said rollers within said sleeve, said means including a bearing for said journal adapted to be fastened to the car, and a cap removably attached to the end of said journal.

4. A car truck structure comprising a wheel, a journal, rollers between said wheel and journal, a bearing for said journal adapted to be fastened to the car and provided with a flange which overlaps the hub at the inside face of the wheel, a cap removably attached to the end of the journal and provided with a flange which overlaps the hub at the outside face of the wheel, and packing interposed between said flanges and the hub of the wheel.

5. A car truck structure comprising a bearing adapted to be fastened to the car underframe, a journal extending through said bearing, a cap removably attached to the end of said journal, and a wheel arranged between said cap and bearing.

6. A car truck structure comprising a bearing adapted to be fastened to the car underframe, a journal extending through said bearing, a cap removably attached to the end of said journal, a wheel arranged between said cap and bearing, and a chafing ring between said cap and wheel.

WILLIAM MILLEN DUNCAN.

In the presence of—
A. B. STRATTON,
A. R. CROSSMAN.

Copies of this patent may be obtained for five cents each, by addressing the "Commissioner of Patents, Washington, D. C."